United States Statutory Invention Registration [19]

[11] Reg. Number: H360

Shukis et al. [43] Published: Nov. 3, 1987

[54] SLURRY FILLED OBSCURATION PAYLOAD

[75] Inventors: Stanley P. Shukis, Aberdeen, Md.; Clayton J. Schneider, Jr., East Aurora; Edward A. Gasiecki, Depew, both of N.Y.

[73] Assignee: The United States of America as represented by the Secretary of the Army, Washington, D.C.

[21] Appl. No.: 28,156

[22] Filed: Mar. 19, 1987

[51] Int. Cl.[4] ..... C06B 27/00

[52] U.S. Cl. ..... 102/334; 149/87

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

An improved device for a smoke obscuration munition includes a thin-walled aerosol can body. A sealed central burster tube is affixed to and extends into the sealed payload within the device. The payload consists of a slurry contained in the annular space outside the burster which includes a highly volatile, low density, low surface tension hydrocarbon liquid and a obscuration agent as the payload.

20 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SLURRY FILLED OBSCURATION PAYLOAD

FIELD OF THE INVENTION

The present invention relates to smoke obscuration payloads and munitions and, more particularly, to a low boiling hydrocarbon slurried obscuration payload positioned in the annular space surrounding a central burster. Canning technology and particularly the aerosol canning technology may be adapted to the munition filling and loading manufacturing process further increasing the desireability of the present invention.

BACKGROUND OF THE INVENTION

Smoke obscuration payloads contained in the M76 grenade are well known in the munitions art. Such payloads are generally dispensed by a burster or detonator. The burster may be centrally located and is commonly used in conjunction with a dry, particulate chemical. When detonated, the burster disseminates the particulate system. Particulate systems include micron size particles of brass or aluminum flakes, or other finely divided particulate. These materials are currently used as fill materials, in a flaked form, or a pelletized form and can be packed as powders to various densities as the payload.

While adequate for the purpose intended, the device and the payload formulation currently in use may be characterized as less than optimal. This is particularly true in regard to the infra-red signature attenuation capabilities associated with munitions payloads of this type and to the low material yield achieved during detonation.

SUMMARY OF THE INVENTION

Accordingly, these and other shortcomings of the prior art are eliminated by an improved obscuration payload consisting of a slurry fill. The slurry is formulated from known dry particulate material such as brass or aluminum particulates and a highly volatile hydrocarbon liquid. The volatile liquid fills the interstitial voids in the otherwise dry system. The slurry system thus enhances the coupling between the explosive discharge of the burster and the minute particles in the fill, thereby greatly minimizing the agglomeration of the particles, reducing the energy input for aerosolization in forming the resultant obscuration cloud.

As the volatile liquid component of the payload must be kept under pressure, the canister in which the payload material is contained may be provided in the form of an aerosol-type can body having a modified aerosol-can dome. The device may thereby contain non-volatile as well as volatile liquid fills under pressure.

It is an object of the present invention to provide an obscuration payload that will create a cloud completely obscuring the infra-red signature and be kept aloft for a longer period as a result of yielding finer particulate and minimizing agglomeration.

It is another object of the present invention to provide a means whereby the explosive energy of the burster detonation is more effectively coupled to the prime payload component.

In accordance with the teachings of the present invention, there is herein disclosed a preferred embodiment, constituting an improved formulated payload for a munition which includes a canister holding a predetermined amount of a slurry. The slurry includes a particulate component and a volatile liquid. The canister is provided in the form of a modified aerosol-type canister whether the fill is in a slurry or dry form.

DESCRIPTION OF THE PREFERRED EMBODIMENT

Figure 1:
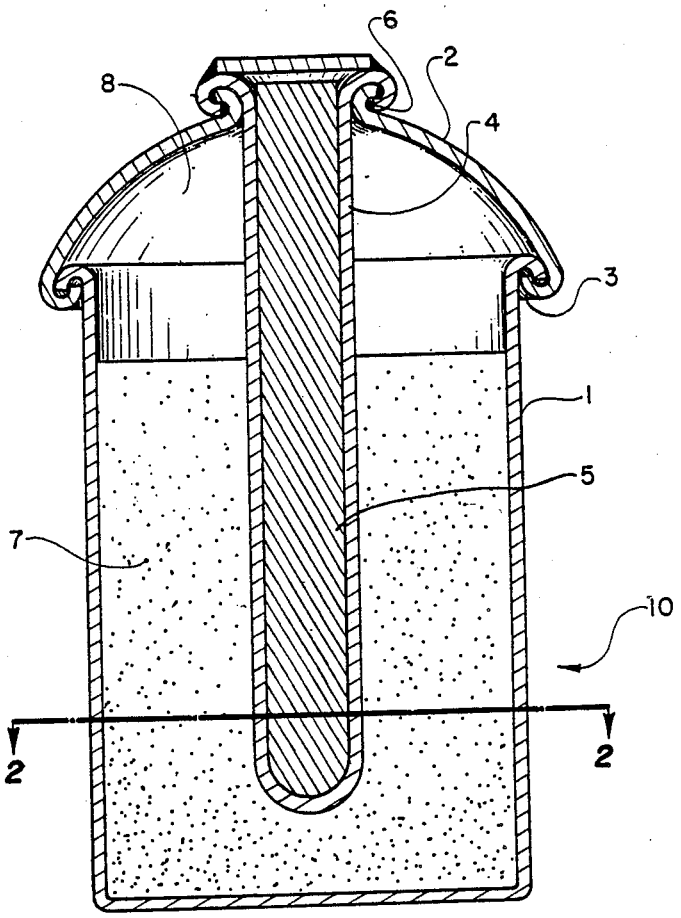
FIG. 1 is a schematic cross-section of a smoke grenade, showing the central burster, slurry filled device in an aerosol-type canister without a launching mechanism present in a complete grenade.
Figure 2:
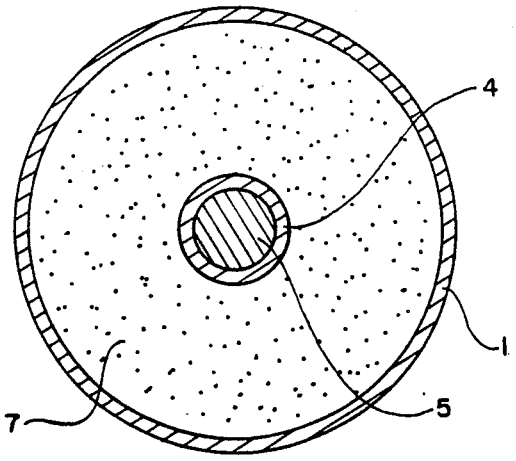
FIG. 2 is a cross-sectional view taken along lines A—A of FIG. 1 illustrating the annular slurry and the central burster tube.

With reference now to FIGS. 1 and 2, the slurry filled obscuration device 10 of the present invention includes a thin walled canister 1. The canister may take various forms and may be provided in numerous sizes canister may be formed from an aerosol-type can. The conventional aerosol canning technology is used to join an aerosol-type can dome 2 to the canister 1. A conventional can seal 3 insures that the contents are maintained under pressure. A burster tube 4 descends from the dome 2 and contains an explosive charge 5. The initiator may be a Dupont No. 8 electric cap or the like. The burster is soldered or otherwise crimp sealed 6 to the dome in any convenient manner. Within the canister and around the burster tube, a slurry 7 is contained under pressure. An ullage is provided to allow for expansion of the liquid and its vapors.

The slurry is composed of at least one of the known particulate obscuration munition media and volatile liquid having a low boiling point. The particulate component may be in the form of flakes, granulated pellets or fine powders. The liquid component of the slurry is selected for its ability to optimize coupling of the burster containing explosive charge to the payload fill system and for its ability to enhance the eventual break up or dispersion of the system. A low surface tension liquid is preferred to maximize the dispersion by reducing the normally substantial interparticulate bonding within the payload. A low density liquid minimizes the gravimetic penalty imposed by adding material to fill the voids. The preferred volatile liquids are iso-butane and n-butane. Other liquids having usable, albeit less-effective characteristics are $C_2Cl_3F_3$ (trichloro, trifluoroethane), $C_2Cl_2F_4$ and n-hexane, in a rapidly descending order of utility. It is believed that the low surface tension of these volatile liquids provides for lower cohesive forces within the bulk of the slurrying liquid and therefore reduce the energy required for dispersal. Lower surface tension also is thought to reduce agglomeration tendencies by better wetting the particles in the slurry.

Volatile liquid type slurries must be effectively contained to prevent both liquid and vapor losses. Adapting aerosol can technology to these munitions payloads is an ideal solution to the containment requirements of volatile slurries. In addition, aerosol technology provides for a thin walled container which is light in weight and inexpensive to produce in large quantities.

Obviously, many modifications may be made without departing from the basic spirit of the present invention. Accordingly, within the scope of the appended claims, the invention may be practiced other than specifically disclosed herein.

What is claimed is:

1. A smoke obscuration device comprising a pressurizeable canister holding a predetermined amount of a slurry, the slurry including a particulate payload material and a volatile liquid under pressure.

2. The device of claim 1, wherein the canister has formed therein a burster tube comprising a sealed central longitudinal chamber extending substantially the length of the canister and having within a means of dispersing through detonation the substantially annular slurried payload contained within the canister.

3. The device of claim 2, wherein the canister is of fragmentation insult and further comprises a thin walled aerosol can body sealed to an aerosol can dome top.

4. The device of claim 3, wherein the highly volatile liquid has a low surface tension and low density to minimize gravimetric penalty by filling the voids of the particulate.

5. The device of claim 4, wherein the highly volatile liquid is selected from the group consisting of iso-butane, $C_2Cl_2F_4$, $C_2Cl_3F_3$, and n-hexane.

6. The device of claim 5, wherein the highly volatile liquid is iso-butane.

7. A method of producing an obscuration device comprising the steps of selecting a liquid medium, mixing said liquid medium with a particulate obscuration material to form a slurry, and placing the slurry into the canister and sealing the canister.

8. The method of claim 7, wherein the liquid medium has a high volatility, a low density and a low surface tension.

9. The method of claim 8, wherein the liquid medium is selected from the group consisting of iso-butane, and n-hexane.

10. The method of claim 9 wherein the liquid medium is iso-butane.

11. The method of claim 7 wherein the sealed canister is a thin walled aerosol-type can.

12. The method of claim 11, wherein the canister has formed therein a burster comprising a sealed longitudinal chamber extending substantially the length of the canister and having within a means of detonating the substantially annular slurried payload contained within the canister.

13. The method of claim 12 wherein the means of detonating the device is an electric blasting cap connected to the burster.

14. A method of producing an obscurative smoke cloud comprising the steps of forming a pressurizeable canister, filling the canister with a slurried obscuring agent, sealing the canister and detonating the canister.

15. The method of claim 14 wherein the canister includes a central burster tube containing the means of detonation, said canister formed from thin-walled metal using aerosol can manufacturing technology.

16. The method of claim 15 wherein the slurried obscuring agent has a liquid component and a solid component, the liquid component having low density and high volatility.

17. The method of claim 16 wherein the liquid component is selected from the group consisting of iso-butane and n-butane.

18. The method of claim 17 wherein the liquid component is iso-butane.

19. A method of producing an obscurative smoke cloud comprising the detonation of a device having therein a slurried obscuring agent, wherein the slurry has a liquid component which has low density and low surface tension and is selected from the group consisting of iso-butane, and n-butane.

20. The method of claim 19 wherein the device is in the form of a thin-walled metal canister, formed using aerosol canning technology.

* * * * *